Oct. 20, 1959  B. P. BAKER ET AL  2,909,591
ELECTRICAL INSULATORS
Filed Sept. 14, 1954  4 Sheets-Sheet 2

WITNESSES:
E. A. McCloskey.
Leon M. Garman

INVENTORS
Benjamin P. Baker
and Paul R. Pierson.
BY
ATTORNEY

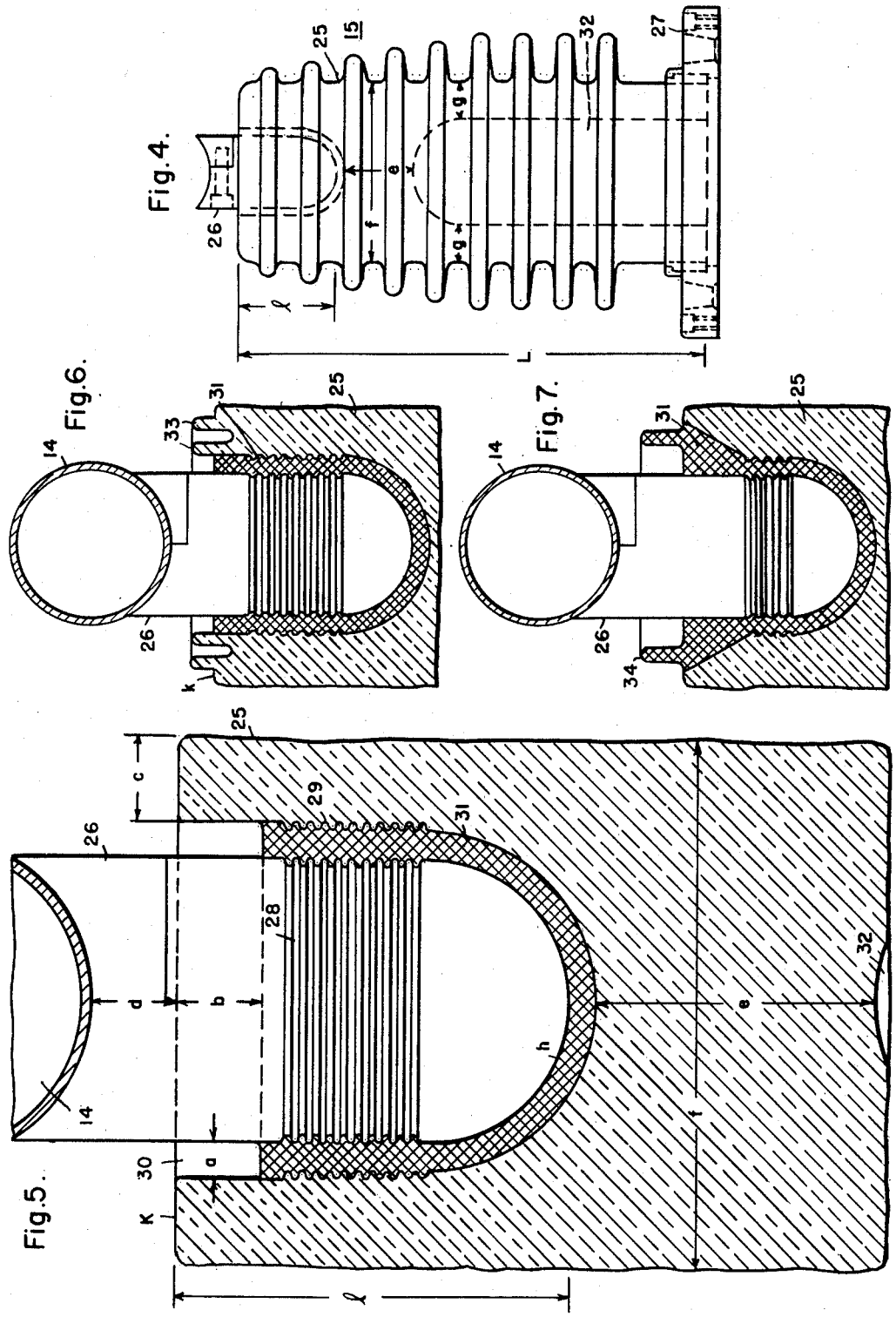

UNITED STATES PATENT OFFICE 2,909,591
Patented Oct. 20, 1959

United States Patent Office

2,909,591

ELECTRICAL INSULATORS

Benjamin P. Baker, Monroeville, and Paul R. Pierson, Penn Township, Allegheny County, Pa., assignors to Westinghouse Electric Corporation, East Pittsburgh, Pa., a corporation of Pennsylvania Application September 14, 1954, Serial No. 455,958

8 Claims. (Cl. 174—177)

Our invention relates, generally, to electrical insulators and, more particularly, to insulators capable of withstanding high impulse voltage values in enclosures where the distance to ground approaches the sphere gap distances at which a given voltage causes flashover.

In high voltage enclosed bus structures, the size of the conductor is, in general, determined by electrical conductivity and mechanical strength. The size of the enclosure is determined by the necessary flashover distance between the bus and the enclosure. As is well known, the flashover voltage between concentric cylinders is considerably higher than that for other commercial constructions with the same spacing. The reasons are associated with both the voltage gradient between the two and the maximum voltage gradient adjacent to the surface of the inner cylinder or conductor. The flashover value is, therefore, very critical with respect to any irregularities on the inner cylinder which may cause a local distortion or increase in the maximum voltage gradient.

Therefore, the solid insulators which are required to support the bus and attaching hardware present a serious problem if they are to fit into the space between the concentric cylinders without lowering the flashover voltage of the complete assembly.

Since the specific inductive capacity of the solid insulation or solid dielectric material is different from that of air, the insulation alone would distort the field next to the bus sufficiently to initiate a flashover its surface. One solution would be to build an insulator with a higher specific inductive capacity at the bus end than at the enclosure end, or make the bus end larger in cross section than the enclosure end. Such designs are either impossible or impractical.

An object of our invention is to so construct an insulator with its hardware that its presence in a nonuniform or radial field distorts the voltage gradient in such a way that the maximum gradient in the air around the insulator or over its surface is actually decreased at the expense of a concentration of voltage through the internal parts of the solid insulating material.

Another object of our invention is to prevent the internal concentration of voltage from causing flashover to occur over external parts of the insulator.

A further object of our invention is to transfer the bus voltage through the attaching hardware deep into the solid dielectric material.

Still another object of our invention is to obtain a substantially uniform voltage gradient along the insulator.

A still further object of our invention is to provide an insulator for supporting a bus in a metal enclosure which will not reduce the flashover value from the bus to the enclosure.

Other objects of our invention will be explained fully hereinafter or will be apparent to those skilled in the art.

In accordance with one embodiment of our invention, the metal insert for an insulator which supports a bus extends into the solid dielectric material a depth approximately 15 to 30 percent of the length of the dielectric and terminates in substantially a hemisphere. The metal is bonded to the dielectric with a material whose specific inductive capacity is approximately equal to that of the dielectric. The proportionate dimensions of the insert and the dielectric and the space between the bus and the dielectric are such that flashover does not occur at a relatively high impulse voltage, such for example, as 350 kv. for a 69 kv. insulator.

For a better understanding of the nature and objects of the invention, reference may be had to the following detailed description, taken in conjunction with the accompanying drawings, in which:

Fig. 4 is an enlarged view, in elevation, of one of the insulators utilized in the switch structure;

Fig. 5 is a still further enlarged view, in section, of a portion of the insulator shown in Fig. 4;

Fig. 6 is an enlarged view, in section, of a modification of the invention; and

Fig. 7 is an enlarged view, in section, of another modification of the invention.

Figure 1:
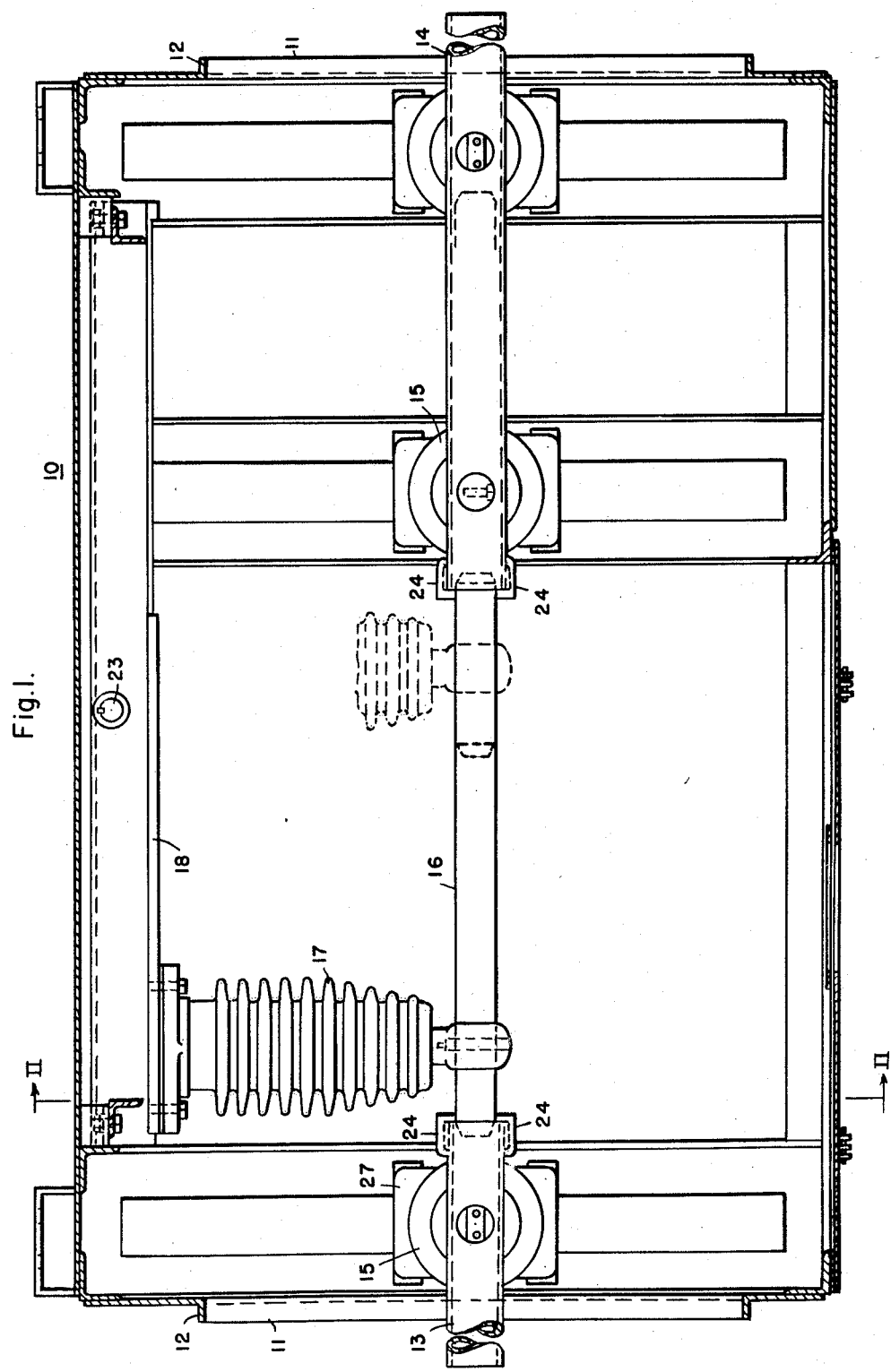
Figure 1 is a view, partly in side elevation and partly in section, of an enclosed disconnecting switch structure having insulators therein embodying the principal features of the invention.
Figure 2:
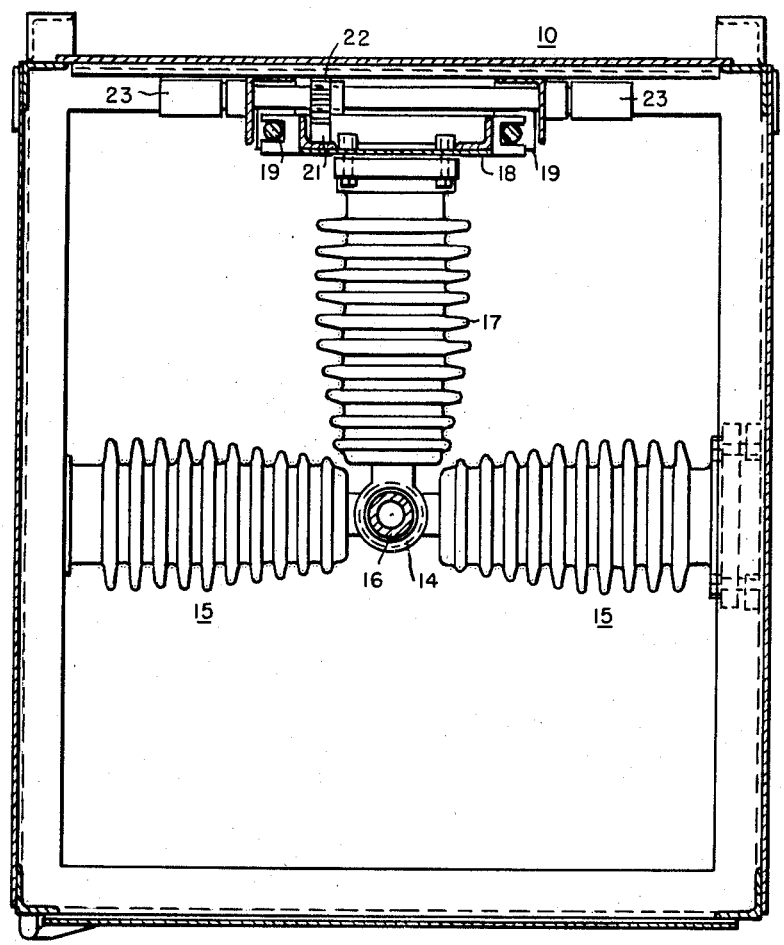
Fig. 2 is a view, in section, taken along the line II—II in Fig. 1.
Figure 3:
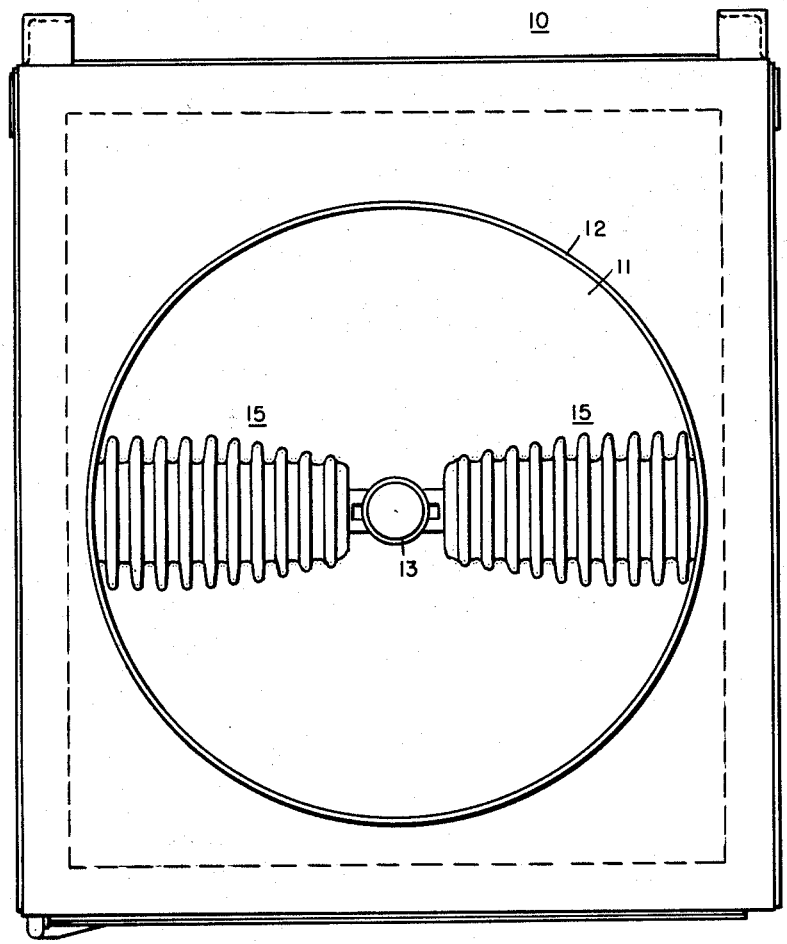
Fig. 3 is a view, in end elevation, of the switch structure shown in Fig. 1.

Referring to the drawings, and particularly to Figs. 1, 2 and 3, the structure shown therein comprises a disconnecting switch which is suitable for utilization in an isolated phase bus structure of the general type described in Patent 2,531,017 issued November 21, 1950 to C. P. West, P. R. Pierson and H. H. Rugg. The present disconnecting switch is fully described in a copending application of P. R. Pierson, H. H. Rugg and R. R. Jank, Serial No. 455,972, filed September 14, 1954, now Patent No. 2,813,178, issued November 12, 1957.

Briefly, the disconnecting switch comprises a box-like metal housing 10 having circular openings 11 at opposite ends of the housing. It will be understood that round housing sections (not shown) of the general type described in the aforesaid patent may be attached to flanges 12 provided around the circular openings 11 in the ends of the housing 10, thereby enclosing cylindrical conductors 13 and 14 which extend through the openings 11. As shown, the conductors 13 and 14 are hollow, with one end of each conductor terminating inside the housing 10.

As shown in Fig. 3, the cylindrical conductor 13 is supported by oppositely disposed insulators 15 which are mounted inside the housing 10. As shown in Fig. 2, the cylindrical conductor 14 is also supported by insulators 15 mounted in the housing 10. The manner in which the insulators support the conductor is described in the aforesaid copending application, Serial No. 455,972, now Patent No. 2,813,178. It will be understood that additional insulators of the type shown may be provided in the bus housing which is attached to the ends of the housing 10 and encloses the bus throughout its entire length.

As shown in Figs. 1 and 2, a reciprocating switch member 16 connects the ends of the conductors 13 and 14 inside the housing 10. The switch member 16 telescopes into the conductor 14, as shown by the broken lines, when the switch is in the open position.

The switch member 16 is supported by an insulator 17 which is mounted on a reciprocating carriage 18. As shown most clearly in Fig. 2, the carriage 18 is slidably supported on a pair of spaced rods 19 mounted in the housing 10. The carriage 18 is reciprocated by a rack 21 and pinion 22. The pinion 22 is driven by a shaft 23 which extends transversely of the housing 10.

Electrical contact between the ends of the switch member 16 and the conductors 13 and 14 is maintained by a plurality of spring-biased contact fingers 24 disposed around the periphery of the cylindrical conductors 13 and 14. The contact fingers 24 and the manner of mounting them on the conductors are fully described in a copending application of H. H. Rugg, Serial No. 460,171, filed October 4, 1954, now Patent No. 2,813,179, issued November 12, 1957.

As explained hereinbefore, it is essential that the insulators 15 and 17 and their attaching hardware utilized to support the bus and switch members be so constructed that the flashover voltage of the complete assembly is not lowered by the presence of the insulators.

As shown in Figs. 4 and 5, one of the insulators 15 comprises a body 25, which is composed of a solid dielectric material, such as porcelain having a specific inductive capacity of approximately 6, a metal insert 26, which engages the bus 14, and a metal base 27 for attaching the insulator to a supporting structure, such as the housing 10. The base 27 is of the usual construction and is attached to the body 25 in the usual manner. As shown, the metal insert 26 extends into the dielectric body 25 a depth $l$ which is approximately 15 to 30 percent of the length L of the body 25. Preferably the depth $l$ is about 20 percent of the length L. The insert 26 terminates in the dielectric body 25 in substantially a hemisphere $h$.

As shown most clearly in Fig. 5, a plurality of ridges 28 are provided on the insert 26 and similar ridges 29 are provided on the surface of the recess 30 in the body 25 for receiving the insert 26. The ridges 28 and 29 are provided on the cylindrical sides of the insert and recess, leaving the hemispherical end portions smooth. The metal insert is bonded to the dielectric material by a sulphur base cement 31 having a specific inductive capacity substantially the same as that of the dielectric material. The cement 31 is available on the market under trade names, such as "Mineralead" and "Leadite" and contains sulphur, a plasticizer and an inert filler. The ridges 28 and 29 are provided to increase the holding power of the cement to retain the insert in the body 25.

As shown in Fig. 5, the cement 31 is stopped a distance $b$ below the top of the dielectric 25. The distance or space $a$ between the insert 26 and the inner surface of the dielectric 25 should be approximately one-half the distance $b$. The distance $b$ should be approximately equal to the dielectric thickness $c$ and the distance $d$ between the bus 14 and the top of the dielectric material. In this manner voltage is concentrated on the hemispherical surface $h$ and flashover at the cusps $k$ is prevented.

As shown in Fig. 4, a recess 32 is provided in the lower end of the dielectric body 25. The section of dielectric material between the top of the opening 32 and the bottom of the opening 30 for receiving the insert 26, or the distance $e$, should be heavy enough to withstand the full voltage impulse. The section $f$ should not be too much in excess of the annular section $g$, as shown in Fig. 4.

By constructing the body 25 and the metal insert 26 in the foregoing manner, the metal transfers the bus voltage deep into the dielectric material at $h$, presenting a smooth even surface to the dielectric without much change in specific inductive capacity. The metal insert shields its point of attachment at the bus and transfers maximum voltage stress to the inside of the dielectric.

The distances $a$, $b$, $c$ and $d$ are so chosen that while there is a concentration of voltage around $h$, flashover does not occur over the surface either to or around the cusps at $k$. By balancing the sections at $f$, $g$, and below, it is possible to obtain an almost uniform gradient along the insulator even down to the ground plate 27. The total gap is, therefore, reduced, but the maximum gradient is also reduced except around the lower end of the insert at $h$ which is protected by high dielectric strength solid insulation.

The dimensional arrangement $a$, $b$, $c$ and $d$ of Fig. 5 may be departed from by bringing the bonding material 31 between the insert 26 and the dielectric to the surface of the dielectric, as shown in Fig. 6. In this case, the dielectric material 25 is provided with two spaced annular ridges 33 at the top of the dielectric, thereby presenting surfaces to the lines of force in such a manner that neither a discharge will be initiated next to the metal nor will the dielectric surface at the cusp $k$ be overstressed.

As shown in Fig. 7, an annular ridge 34 may be provided at the top of the bonding material 31 instead of the ridges 33 in the dielectric 25 to prevent flashover from occurring. Otherwise, the structures shown in Figs. 6 and 7 are similar to the structure shown in Figs. 4 and 5.

Actual tests have shown that when insulators constructed in the foregoing manner are utilized to support an enclosed bus or conductor, the flashover value from the bus to the enclosure is not decreased. That is, flashover between the bus and the enclosure will occur at a point remote from the supporting insulators. Thus, we have provided an insulator having the necessary mechanical strength to support the bus or conductor in the enclosure and having dielectric characteristics enabling it to withstand a higher impulse voltage than the space between the bus and enclosure remote from the support. Furthermore, the insulator herein described may be readily manufactured and installed in a bus or other switchgear structure.

Since numerous changes may be made in the above-described construction and different embodiments of the invention may be made without departing from the spirit and scope thereof, it is intended that all matter contained in the foregoing description, or shown in the accompanying drawings shall be interpreted as illustrative and not in a limiting sense.

We claim as our invention:

1. In an insulator for supporting a conductor, in combination, a body of solid dielectric materials having a recess therein, a generally cylindrical metal insert having one end extending above the top of said body and adapted to engage the conductor and the other end secured in the recess with a bonding material having substantially the same specific inductive capacity as the dielectric material, the end of the insert in the recess being substantially hemispherical in shape, and the top of the bonding material being below the top of the dielectric material a distance substantially equal to the distance between the conductor and the top of the dielectric, whereby the inner surface of the dielectric material is spaced from the metal insert at the top of the bonding material.

2. In an insulator for supporting a conductor, in combination, a body of solid dielectric material having a recess therein, a generally cylindrical metal insert having one end extending above the top of said body and adapted to engage the conductor and the other end secured in the recess with a bonding material having substantially the same specific inductive capacity as the dielectric material, the end of the insert in the recess being substantially hemispherical in shape, said insert being spaced from the inner surface of the dielectric at the top of the bonding material a distance approximately one-half the thickness of the dielectric wall surrounding the recess, and the distance between the conductor and the top of the body being not less than the thickness of the dielectric wall surrounding the recess.

3. In an insulator for supporting a conductor, in combination, a body of solid dielectric material having a recess therein, a metal insert having one end adapted to engage the conductor and the other end secured in the recess with a sulfur base bonding material having substantially the same specific inductive capacity as the dielectric material, the end of the insert in the recess being substantially hemispherical in shape, said insert being spaced from the inner surface of the dielectric at the top of the bonding material a distance approximately one-half the thickness of the dielectric wall surrounding the recess, said insert having a cylindrical portion extending above the dielectric to engage the conductor, and the thickness of the dielectric wall being substantially equal to the distance between the conductor and the top of the dielectric.

4. In an insulator for supporting a conductor in combination, a body of solid dielectric material having a recess therein, a metal insert having one end adapted to engage the conductor and the other end secured in the recess with a bonding material having substantially the same specific inductive capacity as the dielectric material, the end of the insert in the recess being substantially hemispherical in shape, said insert having a cylindrical portion extending above the dielectric to engage the conductor, the distance between the conductor and the top of the body being not less than the thickness of the dielectric wall surrounding the recess, and the thickness of the bonding material at its top being approximately one-half the thickness of the top of the dielectric wall surrounding the recess.

5. In an insulator for supporting a conductor, in combination, a body of solid dielectric material having a recess therein, a generally cylindrical metal insert having one end extending beyond the body and adapted to engage the conductor and the other end secured in the recess with a bonding material containing sulphur, a plasticizer and an inert filler, said bonding material having substantially the same specific inductive capacity as the dielectric material, the end of the insert in the recess being substantially hemispherical in shape, the top of the bonding material being substantially on a level with the top of the dielectric material, and a pair of annular ridges formed in the top of the dielectric material and extending above the top of the bonding material.

6. In an insulator for supporting a conductor, in combination, a body of solid dielectric material having a recess therein, a generally cylindrical metal insert having one end extending beyond the body and adapted to engage the conductor and the other end secured in the recess with a bonding material having substantially the same specific inductive capacity as the dielectric material, the end of the insert in the recess being substantially hemispherical in shape, the top of the bonding material being substantially on a level with the top of the dielectric material, and an annular ridge formed in the top of the bonding material, said ridge being spaced from said metal insert.

7. In an insulator for supporting a conductor, in combination, a metal base, a body of dielectric material having one end attached to the base and having a recess in each end with solid dielectric material between the bottoms of said recesses, a metal insert having one end adapted to engage the conductor and the other end secured in the recess opposite the base with a bonding material, said insert extending into the body a depth approximately 15 to 30 percent of the length of the body, the end of the insert in the body being substantially hemispherical in shape, said insert having a cylindrical portion extending above the dielectric body to engage the conductor, the distance between the conductor and the body being not less than the thickness of the dielectric wall surrounding the recess containing the insert, and said other recess being hollow with the thickness of dielectric material surrounding the hollow recess being substantially uniform along said hollow recess, thereby obtaining a substantially uniform voltage gradient along the insulator.

8. An insulator for supporting a conductor, said insulator comprising a body of solid insulating material having a recess in one end thereof, a generally cylindrical metal insert having a substantially hemispherical end disposed in said recess, said insert having a cylindrical portion extending above the insulating body to engage the conductor, the distance between the conductor and the body being substantially the same as the thickness of the insulating wall surrounding the recess containing the insert, a hollow recess in the other end of the body, said hollow recess extending toward the first recess with solid insulating material between the bottoms of said recesses, the thickness of insulating material surrounding the hollow recess being substantially uniform along said hollow recess, thereby decreasing the maximum voltage gradient when the insulator is placed in a non-uniform electrostatic field.

References Cited in the file of this patent
UNITED STATES PATENTS

| | | |
|---|---|---|
| 789,573 | Steinberger | May 9, 1905 |
| 838,482 | Weed | Dec. 11, 1906 |
| 1,684,152 | Schramm | Sept. 11, 1928 |
| 1,689,906 | Aalborg | Oct. 30, 1928 |
| 1,764,419 | Schramm | June 17, 1930 |
| 1,873,750 | Fortescue | Aug. 23, 1932 |
| 1,988,369 | Brown | Jan. 15, 1935 |
| 2,671,822 | McMahon | Mar. 9, 1954 |

FOREIGN PATENTS

| | | |
|---|---|---|
| 1,013,877 | France | May 7, 1952 |